United States Patent
Tang et al.

(10) Patent No.: US 10,602,028 B2
(45) Date of Patent: Mar. 24, 2020

(54) COLOR TABLE COMPRESSION

(71) Applicants: HEWLETT-PACKARD DEVELOPMENT COMPANY, L.P., Spring, TX (US); PURDUE RESEARCH FOUNDATION, West Lafayette, IN (US)

(72) Inventors: Chuohao Tang, Fremont, CA (US); Amy Ruth Reibman, West Lafayette, IN (US); Jan P. Allebach, West Lafayette, IN (US); Sean Michael Collison, Meridian, ID (US); Mark Q. Shaw, Meridian, ID (US); Jay S. Gondek, Camas, WA (US)

(*) Notice: Subject to any disclaimer, the term of this patent is extended or adjusted under 35 U.S.C. 154(b) by 0 days.

(21) Appl. No.: 16/316,227

(22) PCT Filed: Jul. 8, 2016

(86) PCT No.: PCT/US2016/041633
§ 371 (c)(1),
(2) Date: Jan. 8, 2019

(87) PCT Pub. No.: WO2018/009226
PCT Pub. Date: Jan. 11, 2018

(65) Prior Publication Data
US 2019/0306375 A1 Oct. 3, 2019

(51) Int. Cl.
*H04N 1/60* (2006.01)
*B41J 29/393* (2006.01)
(Continued)

(52) U.S. Cl.
CPC ........ *H04N 1/6097* (2013.01); *B41J 2/17546* (2013.01); *B41J 2/525* (2013.01);
(Continued)

(58) Field of Classification Search
None
See application file for complete search history.

(56) References Cited

U.S. PATENT DOCUMENTS

| 5,644,509 A | 7/1997 | Schwartz |
| 5,680,129 A * | 10/1997 | Weinberger .......... H04N 19/593 341/65 |

(Continued)

FOREIGN PATENT DOCUMENTS

| CN | 101876799 | 11/2010 |
| CN | 102035990 | 4/2011 |

(Continued)

OTHER PUBLICATIONS

U.S. Appl. No. 15/702,138, Non-Final Rejection dated Oct. 5, 2018, pp. 1-9 and attachments.

(Continued)

*Primary Examiner* — Anh-Vinh T Nguyen
(74) *Attorney, Agent, or Firm* — Trop Pruner & Hu PC

(57) ABSTRACT

A memory device includes a compressed color table and corrective information. The compressed color table includes a first set of nodes of the color table compressed with a lossy compression at a selected compression ratio. The first set of nodes include a color difference within an error threshold at the selected compression ratio. Corrective information is included for a second set of nodes of the color table. The second set of nodes have a color difference outside the error threshold.

27 Claims, 5 Drawing Sheets

(51) Int. Cl.

| | | |
|---|---|---|
| *B41J 2/525* | (2006.01) | |
| *H04N 1/41* | (2006.01) | |
| *H04N 1/00* | (2006.01) | |
| *H04N 1/23* | (2006.01) | |
| *G06K 15/02* | (2006.01) | |
| *B41J 2/175* | (2006.01) | |

(52) U.S. Cl.
CPC ........ *B41J 29/393* (2013.01); *G06K 15/1828* (2013.01); *H04N 1/00538* (2013.01); *H04N 1/2323* (2013.01); *H04N 1/2369* (2013.01); *H04N 1/41* (2013.01); *H04N 1/603* (2013.01); *H04N 1/6019* (2013.01); *H04N 1/6025* (2013.01); *H04N 1/6055* (2013.01); *H04N 1/6058* (2013.01); *H04N 2201/0094* (2013.01)

(56) References Cited

U.S. PATENT DOCUMENTS

| | | | |
|---|---|---|---|
| 5,748,176 A | 5/1998 | Gondek | |
| 5,751,434 A | 5/1998 | Narendranath et al. | |
| 5,930,553 A | 7/1999 | Hirst et al. | |
| 5,982,990 A | 11/1999 | Gondek | |
| 6,002,814 A * | 12/1999 | Chadez | G06K 15/02 358/1.15 |
| 6,313,925 B1 | 11/2001 | Decker et al. | |
| 6,327,383 B2 | 12/2001 | Todoroki | |
| 6,370,502 B1 * | 4/2002 | Wu | G10L 19/00 704/230 |
| 6,778,709 B1 * | 8/2004 | Taubman | H04N 19/70 348/395.1 |
| 6,804,025 B1 | 10/2004 | Ueda Masashi et al. | |
| 6,816,179 B2 | 11/2004 | Hanyu | |
| 7,221,473 B2 | 5/2007 | Jeran | |
| 7,259,890 B2 | 8/2007 | Jeran | |
| 7,633,658 B2 | 12/2009 | Tsuji | |
| 7,663,781 B2 | 2/2010 | Song et al. | |
| 7,796,296 B2 | 9/2010 | Martinez et al. | |
| 7,826,111 B2 | 11/2010 | Won et al. | |
| 8,203,758 B2 | 6/2012 | Itagaki | |
| 8,274,696 B2 | 9/2012 | Yoneda | |
| 8,526,062 B2 | 9/2013 | Klassen | |
| 8,740,343 B2 | 6/2014 | Kawai | |
| 8,797,616 B2 | 8/2014 | Sugiura et al. | |
| 8,885,216 B2 | 11/2014 | Ishitoya et al. | |
| 9,111,204 B2 | 8/2015 | Fujita et al. | |
| 9,621,764 B2 | 4/2017 | Gondek | |
| 9,796,186 B1 | 10/2017 | Nichols | |
| 9,800,765 B2 | 10/2017 | Gondek et al. | |
| 9,819,835 B2 | 11/2017 | Nichols | |
| 9,992,382 B2 | 6/2018 | Hu et al. | |
| 1,016,515 A1 | 12/2018 | Hu | |
| 1,030,611 A1 | 5/2019 | Tang | |
| 1,034,153 A1 | 7/2019 | Hu | |
| 1,035,628 A1 | 7/2019 | Shaw | |
| 2002/0126301 A1 * | 9/2002 | Bowers | B41J 2/17546 358/1.9 |
| 2002/0149785 A1 | 10/2002 | Chu et al. | |
| 2003/0016259 A1 | 1/2003 | Otokita | |
| 2003/0025939 A1 | 2/2003 | Jeran | |
| 2003/0098986 A1 | 5/2003 | Pop | |
| 2003/0214686 A1 | 11/2003 | Saito et al. | |
| 2004/0056835 A1 * | 3/2004 | Curry | H04N 1/41 345/100 |
| 2004/0136016 A1 | 7/2004 | Oshikawa | |
| 2004/0233484 A1 | 11/2004 | Seko | |
| 2005/0073731 A1 | 4/2005 | Deer et al. | |
| 2006/0187252 A1 | 8/2006 | Deer | |
| 2007/0081205 A1 | 4/2007 | Tai et al. | |
| 2007/0115506 A1 | 5/2007 | Yada | |
| 2007/0195342 A1 | 8/2007 | Sugiura et al. | |
| 2007/0291287 A1 | 12/2007 | Snyder et al. | |
| 2008/0037046 A1 | 2/2008 | Nishikawa | |
| 2009/0160978 A1 | 6/2009 | Getman | |
| 2010/0053650 A1 | 3/2010 | Yamamoto | |
| 2010/0085605 A1 | 4/2010 | Shaw et al. | |
| 2010/0157331 A1 | 6/2010 | Shestak | |
| 2010/0157339 A1 | 6/2010 | Yamada | |
| 2010/0220926 A1 | 9/2010 | Monga et al. | |
| 2010/0296114 A1 | 11/2010 | Jung et al. | |
| 2012/0206744 A1 | 8/2012 | Kobayashi | |
| 2012/0218574 A1 | 8/2012 | Fukuda | |
| 2013/0114094 A1 | 5/2013 | Sugiura | |
| 2014/0056512 A1 | 2/2014 | Lerios | |
| 2014/0098387 A1 | 4/2014 | Chang | |
| 2015/0103902 A1 | 4/2015 | Li et al. | |
| 2016/0112605 A1 | 4/2016 | Manda | |
| 2016/0112606 A1 * | 4/2016 | Gondek | H04N 1/6019 358/1.9 |
| 2016/0303878 A1 | 10/2016 | Andrea Tallada | |
| 2017/0225475 A1 | 8/2017 | Nichols et al. | |
| 2018/0013928 A1 * | 1/2018 | Shaw | B41J 29/393 |
| 2018/0013929 A1 * | 1/2018 | Tang | B41J 2/17546 |
| 2018/0111385 A1 | 4/2018 | Shimomukai | |
| 2018/0255205 A1 * | 9/2018 | Hu | B41J 2/17546 |
| 2018/0293758 A1 * | 10/2018 | Bar-On | G06T 9/002 |

FOREIGN PATENT DOCUMENTS

| | | |
|---|---|---|
| CN | 103139443 A | 6/2013 |
| CN | 105103531 | 11/2015 |
| JP | H09107481 | 4/1997 |
| JP | 2002016943 | 1/2002 |
| JP | 2002209114 | 7/2002 |
| JP | 2003110869 A | 4/2003 |
| JP | 2007221720 | 8/2007 |
| JP | 2014200014 | 10/2014 |
| RU | 2337392 | 10/2008 |
| RU | 2415454 | 3/2011 |
| TW | 201505861 A | 2/2015 |
| WO | WO-2006081253 | 8/2006 |
| WO | WO-2015016860 | 2/2015 |
| WO | WO-2015042432 | 3/2015 |
| WO | WO-2016028272 | 2/2016 |
| WO | WO-2016186625 | 11/2016 |

OTHER PUBLICATIONS

Arnavut, Z et al, Lossless Compression of Color Palette Images with One-dimensional Techniques, Apr.-Jun. 2006, < http://scholarworks.rit.edu/cgi/viewcontent.cgi?article=2049&context=article > (13 pages).

Balaji et al., Hierarchical Compression of Color Look Up Tables, 15th Color imaging Conference Final Program and Proceedings, 2008 (6 pages).

Balaji et al., Preprocessing Methods for Improved Lossless Compression of Color Look-up Tables, Journal of Imaging Science and Technology, 2008 (9 pages).

Boon-Lock Yeo and Bede Liu, Volume rendering of DCT-based compressed 3D scalar data, IEEE Transactions on Visualization and Computer Graphics, 1(1):29-43, Mar. 1995 (15 pages).

Canon Imagepress Server Color Management Guide, 2009, < http://www.teensupport.cusa.canon.com/pt/MHPContent/imagepress/iPress-Server-Color-Guide.pdf > (31 pages).

Chuohao Tang et al., U.S. Appl. No. 15/611,462 entitled Color Table Compression filed Jun. 1, 2017 (33 pages).

De Queiroz et al., On Independent Color Space Transformations for the Compression of CMYK Images; IEEE Transactions on Image Processing, vol. 8, No. 10, Oct. 1999 (6 pages).

Deutsch, Network Working Group, Request for Comments: 1952, Category: Informational, GZIP file format specification version 4.3, May 1996 (19 pages).

European Patent Office, Communication—European Search Report for Appl. No. 17180591.4 dated Nov. 27, 2017 (4 pages).

European Patent Office, Communication pursuant to Article 94(3) EPC for App. No. 17179824.2 dated Dec. 20, 2017 (5 pages).

European Patent Office, International Search Report and Written Opinion for PCT/US2016/041633 dated Mar. 20, 2017 (19 pages).

European Patent Office, International Search Report and Written Opinion for PCT/US2016/060873 dated Mar. 20, 2017 (16 pages).

(56) References Cited

OTHER PUBLICATIONS

European Patent Office, International Search Report and Written Opinion for PCT/US2016/060874 dated Mar. 14, 2017 (16 pages).
European Patent Office, International Search Report and Written Opinion for PCT/US2016/060875 dated Mar. 14, 2017 (18 pages).
European Patent Office, International Search Report and Written Opinion for PCT/US2016/060876 dated Mar. 9, 2017 (14 pages).
European Patent Office, International Search Report and Written Opinion for PCT/US2016/060877 dated Mar. 10, 2017 (17 pages).
European Patent Office, Written Opinion of the International Preliminary Examining Authority for PCT/US2013/052862 dated Jul. 3, 2015 (7 pages).
Hewlett-Packard Development Company L.P., International Application No. PCT/US2016/060875 entitled Printing Device Supply Component filed Nov. 7, 2016 (42 pages).
Hewlett-Packard Development Company L.P., International Application No. PCT/US2016/060876 entitled Printing Device Supply Component filed Nov. 7, 2016 (38 pages).
Hewlett-Packard Development Company, L.P., International Appl. No. PCT/US2016/041633 entitled Color Table Compression filed Jul. 8, 2016 (29 pages).
ICC Profiles dated on or before Jun. 26, 2016 (2 pages).
International Color Consortium, Specification, ICC.1:2010 (Profile version 4.3.0.0) Image technology colour management—Architecture, profile format, and data structure [Revision of ICC. 1:Oct. 2004], 2010 (130 pages).
Kim, Low Bit-Rate, Scalable Video Coding with 3D Set Paritioning in Hierarchical Trees (3D SPIHT), date unknown (34 pages).
lexmark.com—Color Quality Guide, Oct. 17, 2007, < http://publications.lexmark.com/publications/pdfs/2007/cx310/cx310_hmp/en/color-quality-guide.pdf > (5 pages).
Lou—Abstract Only—The development of the CIE 2000 colour-difference formula: CIEDE2000, Aug. 2001 (4 pages).
Luo et al., Uniform Colour Spaces Based on CIECAM02 Colour Appearance Model, 2006 (11 pages).
LZMA-SDK (Software Development Kit) dated on or before Jan. 7, 2009 (2 pages).
Mark Q. Shaw et al., U.S. Appl. No. 15/702,138 entitled Printing Device Supply Component filed Sep. 12, 2017 (42 pages).
Monga, V. et al, "Design and Optimization of Color Lookup Tables on a Simplex Topology", Apr. 2012, pp. 1981-1996.
Office Actions of File History of U.S. Appl. No. 15/986,915, dated Sep. 13, 2019, Nov. 28, 2018, and Jul. 6, 2018 (42 pages).
Robertson, Color Research & Application—Abstract Only, 1977 (4 pages).
Said, A New Fast and Efficient Image Codec Based on Set Partitioning in Hierarchical Trees, IEEE, May 1993 (16 pages).
Shapiro, Embeeded Image Coding Using Zerotrees of Wavelet Coefficients, IEEE, Dec. 1993 (18 pages).
Sudhakar, Image Compression using Coding of Wavelet Coefficients—A Survey, Jun. 2005 (14 pages).
Tang, ICC Profile Color Table Compression, Nov. 7, 2016 (6 pages).
Tang, Three-Dimensional Wavelet-Based Compression of Hyperspectral Images, 2006 (36 pages).
U.S. Appl. No. 15/611,462, Examiner's Answer dated May 30, 2018 (25 pages).
U.S. Appl. No. 15/611,462, Final Rejection dated Dec. 1, 2017, pp. 1-20 and attachments.
U.S. Appl. No. 15/611,462, Non-Final Rejection dated Jul. 28, 2017, pp. 1-13 and attachment.
U.S. Appl. No. 15/642,929, Non-Final Rejection dated Sep. 1, 2017 (5 pages).
U.S. Appl. No. 15/970,338, Non-Final Rejection dated Jun. 7, 2018, pp. 1-4 and attachments.
U.S. Appl. No. 15/970,338, Notice of Allowance dated Aug. 31, 2018, pp. 1-3 and attachments.
Watson, Image Compression Using the Discrete Cosine Transform, 1994 (17 pages).
Zhenhua Hu et al., U.S. Appl. No. 15/642,929 entitled Color Table Compression filed Jul. 6, 2017 (29 pages).

* cited by examiner

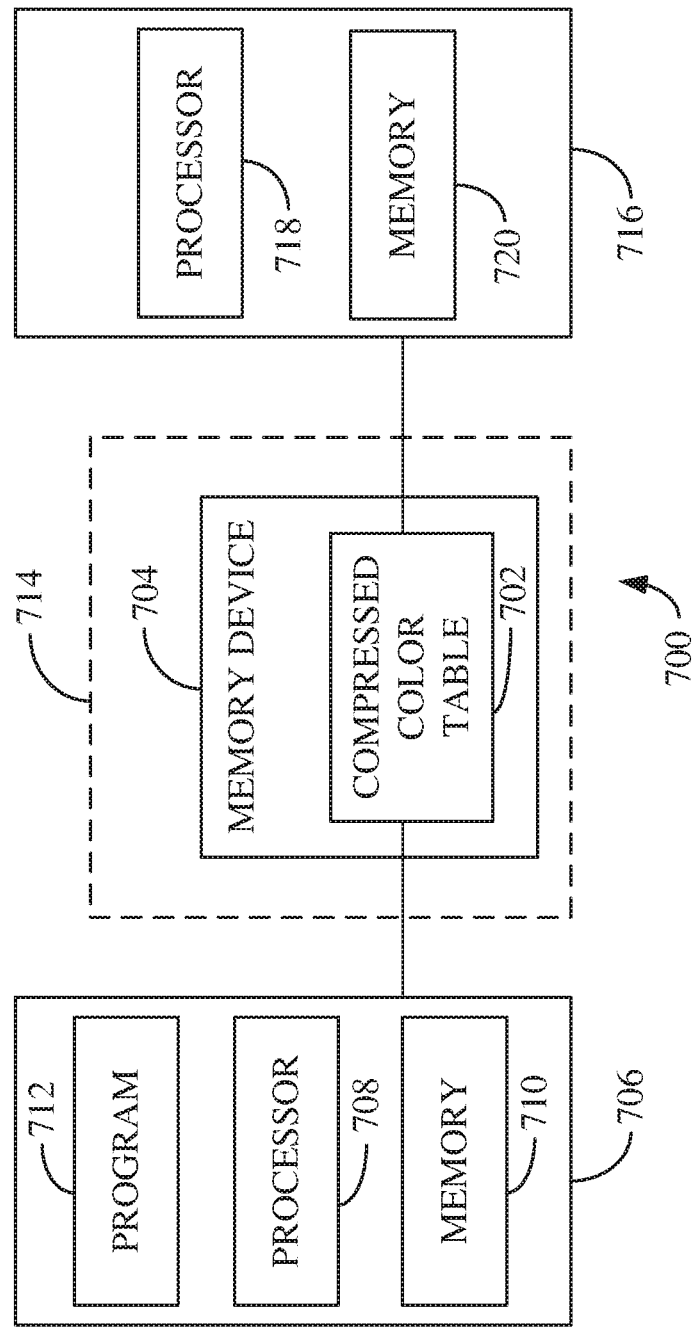

COLOR TABLE COMPRESSION

BACKGROUND

Color management systems deliver a controlled conversion between color representations of various devices, such as image scanner, digital camera, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

BRIEF DESCRIPTION OF THE DRAWINGS

FIG. 7 is a block diagram illustrating an example system incorporating examples of the methods of FIGS. 2 and 4-6 and the memory devices of FIGS. 1 and 3.

DETAILED DESCRIPTION

Figure 1:
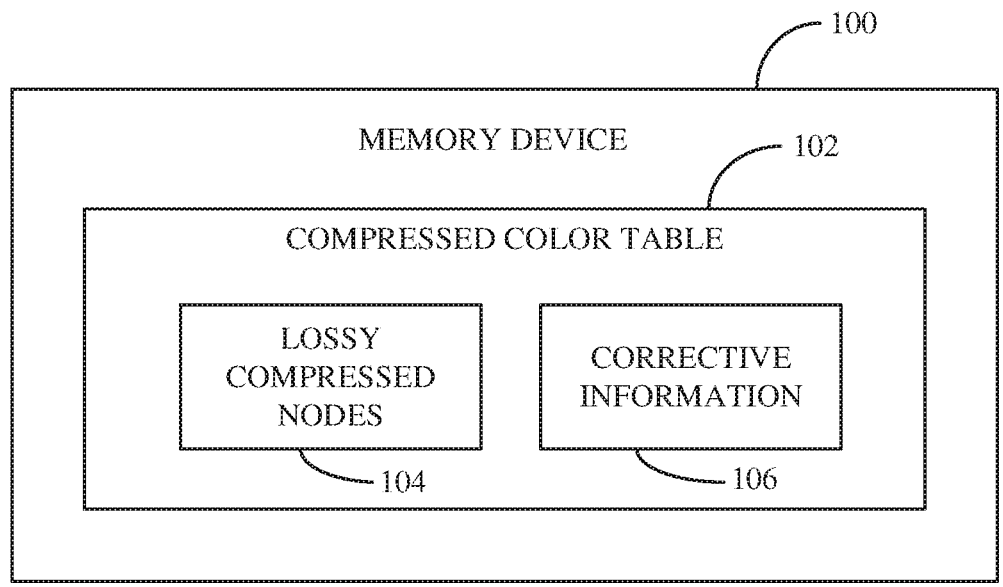
FIG. 1 is a block diagram illustrating an example memory device having a compressed a color table.

In the following detailed description, reference is made to the accompanying drawings, which form a part hereof, and in which are shown by way of illustration as specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A color space is a system having axes and that describes color numerically. Some output devices, such as printing devices, may employ a type of cyan-magenta-yellow-key (black) (CMYK) color space, while some software applications and display devices may employ a type of red-green-blue (RGB) color space. For example, a color represented in the CMYK color space has a cyan value, a magenta value, a yellow value, and a key value that combined numerically represent the color.

A color profile is a set of data that characterizes a color space. In one example, a color profile can describe the color attributes of a particular device or viewing specifications with a mapping between the device-dependent color space, such as a source or target color space, and a device-independent color space, such as profile connection space, and vice versa. The mappings may be specified using tables such as look up tables, to which interpolation is applied, or through a series of parameters for transformations. Devices and software programs—including printers, monitors, televisions, operating systems, browsers, and other device and software—that capture or display color can include profiles that comprise various combinations of hardware and programming.

An ICC profile is an example color profile that is a set of data that characterizes a color space according to standards promulgated by the International Color Consortium (ICC). Examples of this disclosure using ICC profiles, however, are for illustration only, and the description is applicable to other types of color profiles or color spaces.

The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices, which increases the total size of these documents. The size of color tables will also increase with finer sampling of the spaces and larger bit depths.

Color tables that provide transformations between various color spaces are extensively used in color management, common examples being the transformations from device independent color spaces (such as CIELAB, i.e., L*a*b*) to device dependent color spaces (such as RGB or CMYK) and vice versa. For devices such as color printers, the color tables are often embedded in the printer firmware or other hardware, where the color tables consume computer memory in storage devices. In some scenarios, the amount of firmware memory consumed for storing these color tables can become a concern, particularly as the number of the look up tables in color devices increases to support multiple color spaces, print media, and preferences. The trend toward finer sampling of the spaces and larger bit depths also results in an increase in table sizes, further exacerbating these memory concerns. Additionally, the concerns of efficient memory use and storage space consumption are applicable for color tables that are embedded in color documents such as ICC source profiles. In applications where embedded profiles are used, the embedded profiles represent an overhead.

FIG. 1 illustrates an example memory device 100 including a compressed color table 102, or compressed original color table. The memory device 100 can be included on a printer cartridge. The compressed color table 102 includes a first set of nodes of the original color table compressed with a lossy compression at a selected compression ratio 104. The first set of nodes include a color difference between an original node of the color table and the corresponding reconstructed node of the lossy compressed color table that is within a selected error threshold at the selected compression ratio. Corrective information 106, or corrective data, is included for a second set of nodes. The second set of nodes include a color difference between an original node of the color table and the corresponding reconstructed node of the lossy compressed color table that is outside of the selected error threshold at the selected compression ratio. In one example, the first set of nodes compressed with the lossy compression 104 and the corrective information 106 are stored as a bitstream that can be further compressed with a lossless compression.

The corrective information 106 is applied to the reconstructed nodes corresponding with the second set of nodes upon reconstruction of the compressed color table 102. For example, the first set of nodes 104 can include all of the nodes of the original color table compressed with a lossy compression. The second set of nodes can include the nodes of the original color table that include a color difference outside of the error threshold. Upon reconstruction of the lossy compressed first set of nodes 104, the corrective information 106 is applied to bring the color difference of the reconstructed nodes corresponding with the second set of nodes within an error amount, which can include a second and more stringent error threshold. In one example, corrective information 106 includes the second set of nodes of the original color table. In another example, the corrective information includes residual values that can be applied to the reconstructed nodes corresponding with the second set of nodes in the reconstructed color table to bring the reconstructed nodes corresponding with the second set of nodes within the second, more stringent error amount.

In one example, the corrective information can include the second set of nodes of the color table in which the reconstructed second set of nodes include a color difference outside of the error threshold. The corrective information including the second set of nodes can be stored in the bitstream or as a separate file without lossy compression at the selected compression ratio. For example the set of nodes of the color table that include a color difference outside of the error threshold can be compressed with lossless compression, a lossy compression in which the color difference is within a selected error threshold, or stored without compression.

In a second example, the corrective information can include residual values that can be included with the second set of nodes of a reconstructed table to correct error of the reconstructed first set of nodes to be within the selected error threshold. In one instance, such as for nodes on or proximate the neutral axis, the residual values correct generally all error. In another instance, such as for nodes in the red or dark blue color space, the residual values correct error to be at or about the error threshold. In the second example, the corrective information includes an amount of error acceptable for reconstructed nodes.

Figure 2:
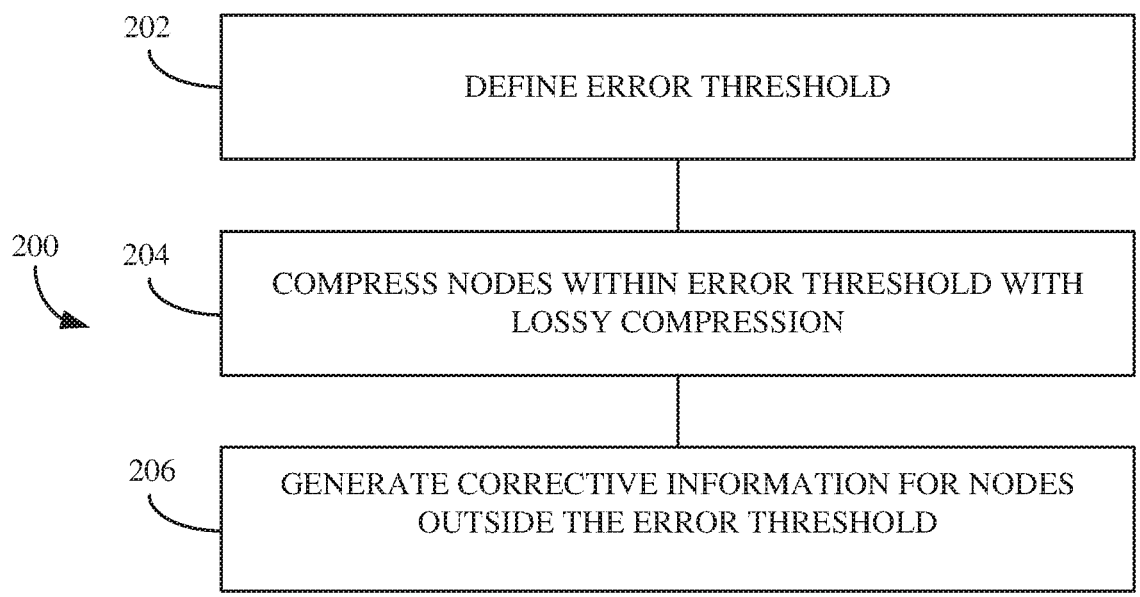
FIG. 2 is a block diagram illustrating an example method of compressing the color table for the memory device of FIG. 1.

FIG. 2 illustrates an example method 200 that can be employed to compress a color table, or original color table. An error threshold is defined for a color difference between an original node in the original color table and a reconstructed node from a lossy compressed and reconstructed original node at a selected ratio of a lossy compression at 202. A first set of nodes of the color table is compressed into a bitstream with lossy compression at the selected compression ratio at 204. The first set of nodes includes a color difference within the error threshold. Corrective information is generated for second set of nodes of the color table having a color difference outside of the error threshold at 206. In one example, the lossy compressed bitstream is further compressed with a lossless compression. The bitstream of the compressed color table can be stored on a memory device, such as memory device 100, that can be included on a printer cartridge.

In one example of method 200, the first set of nodes of the original color table is transformed with a lossy compression to obtain quantized coefficients. The quantized coefficients can be reordered into a one-dimensional bitstream using a multi-dimensional reordering, such as a three-dimensional zigzag ordering. A coefficient bit assignment table is calculated from the quantized coefficients. The coefficient bit assignment table can be applied to the quantized coefficients to reconstruct the coefficients in decompression. The quantized coefficients and the coefficient bit assignment table are stored as a bitstream on a memory device. The quantized coefficients can be reordered into a one-dimensional bitstream using a multi-dimensional reordering, such as a three-dimensional zigzag ordering, which can introduce a large amount of redundancy to the coefficient bit assignment table. The coefficient bit assignment table and the lossy compressed coefficients can be further compressed with the lossless compression that can be written to a binary file on the memory device 100.

Lossless compression and lossy compression are forms of data compression, which includes encoding information using fewer bits than the original representation. In lossless compression, no digital difference exists between the original data and the reconstructed compressed data. In lossy compression, a portion of the original data is lost upon reconstruction of the compressed data.

A variety of lossy and lossless compression systems can be employed in method 200. In one example, the lossy compression can be implemented using a discrete cosine transform, or DCT, which expresses a finite sequence of data points in terms of a sum of cosine functions oscillating at different frequencies, although other systems can be employed. DCT compression can be particularly apt for examples in which color tables may be expressed in multiple dimensions. For example, an ICC profile may include a three-dimensional or a four-dimensional color table, and the lossy compression can be performed using a three-dimensional or four-dimensional DCT process, accordingly. Another lossy compression system could be based on wavelets, such as the SPIHT (Set Partitioning In Hierarchical Trees) and SPECK (Set Partitioned Embedded bloCK). Lossless compression can be implemented using a variety of lossless systems including Lempel-Ziv-Markov chain Algorithm process (or LZMA), GZIP (or GNU-zip) process, or other suitable lossless systems.

The example method 200 can be implemented to include a combination of one or more hardware devices and programs for controlling a system, such as a computing device having a processor and memory, to perform method 200 to compress a color table into a file or a bitstream. For example, method 200 can be implemented as a set of executable instructions for controlling the processor to perform method 200. Other methods of the disclosure can be implemented as a combination of hardware and programming for controlling a system as well. A color table can include an array or other data structure on a memory device that replaces runtime computations with a simpler array indexing operation as a color look up table (CLUT).

Figure 3:
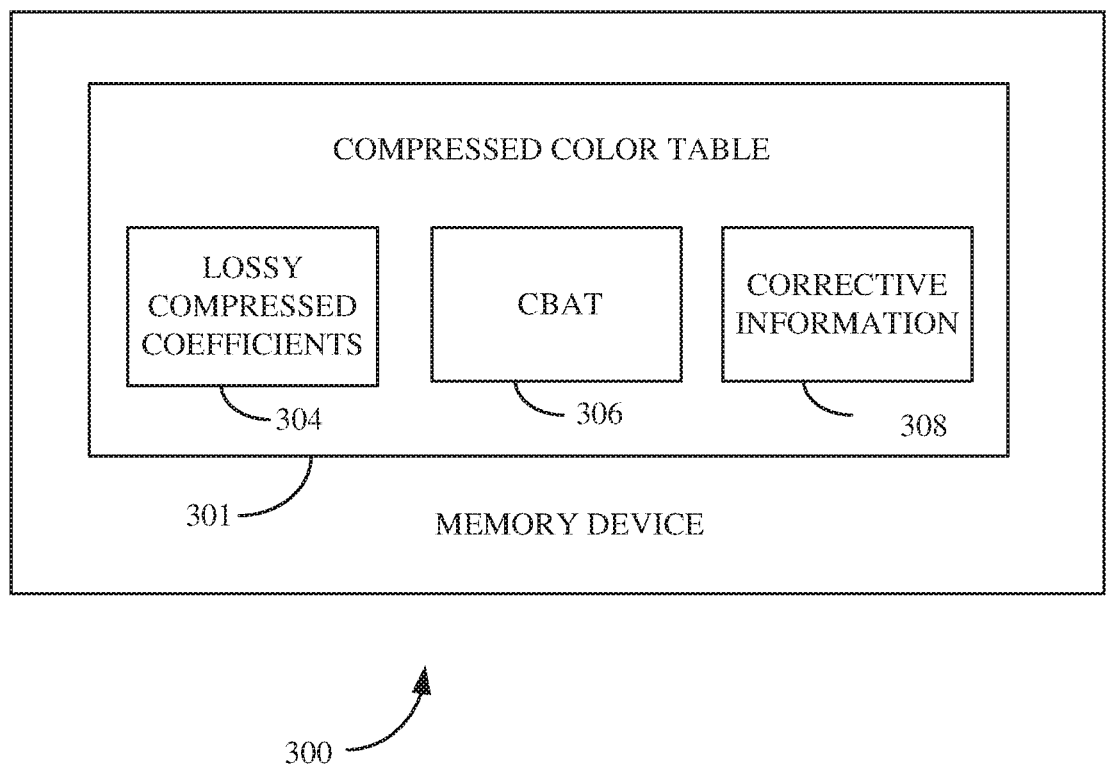
FIG. 3 is a block diagram illustrating another example memory device having compressed color table.

FIG. 3 illustrates an example memory device 300 including a compressed color table 302. The compressed color table 302 stored on the memory device 300 includes quantized coefficients from a lossy compression 304 of an original color table, a coefficient bit assignment table (CBAT) 306, which can be applied to decode the quantized coefficients 304, and corrective information for reconstructed nodes table 308, which are also compressed with a lossless compression. Corrective information can include nodes from the original color table, which when compressed via the chosen lossy compression, yield a reconstruction error that exceeds the threshold. In one example the compressed color table includes the bitstream resulting from one or both of methods 100, 200. In one example, the compressed color table 304, CBAT 306, and corrective information 308 can be further compressed with a lossless compression.

The example memory device 300 can be implemented to include a combination of one or more volatile or nonvolatile computer storage media. Computer storage media may be implemented as any suitable method or technology for storage of information such as computer readable instructions, data structures, program modules or other data. A propagating signal by itself does not qualify as storage media or a memory device. The memory device can be included as part of a system including a processor and memory for storing a set of computer instruction for controlling the processor to perform a color transformation. Examples include a memory device included as part of a printer cartridge that can be read by a printer to perform color transformations based on such specifications such as ink or media parameters or device specifications.

Figure 4:
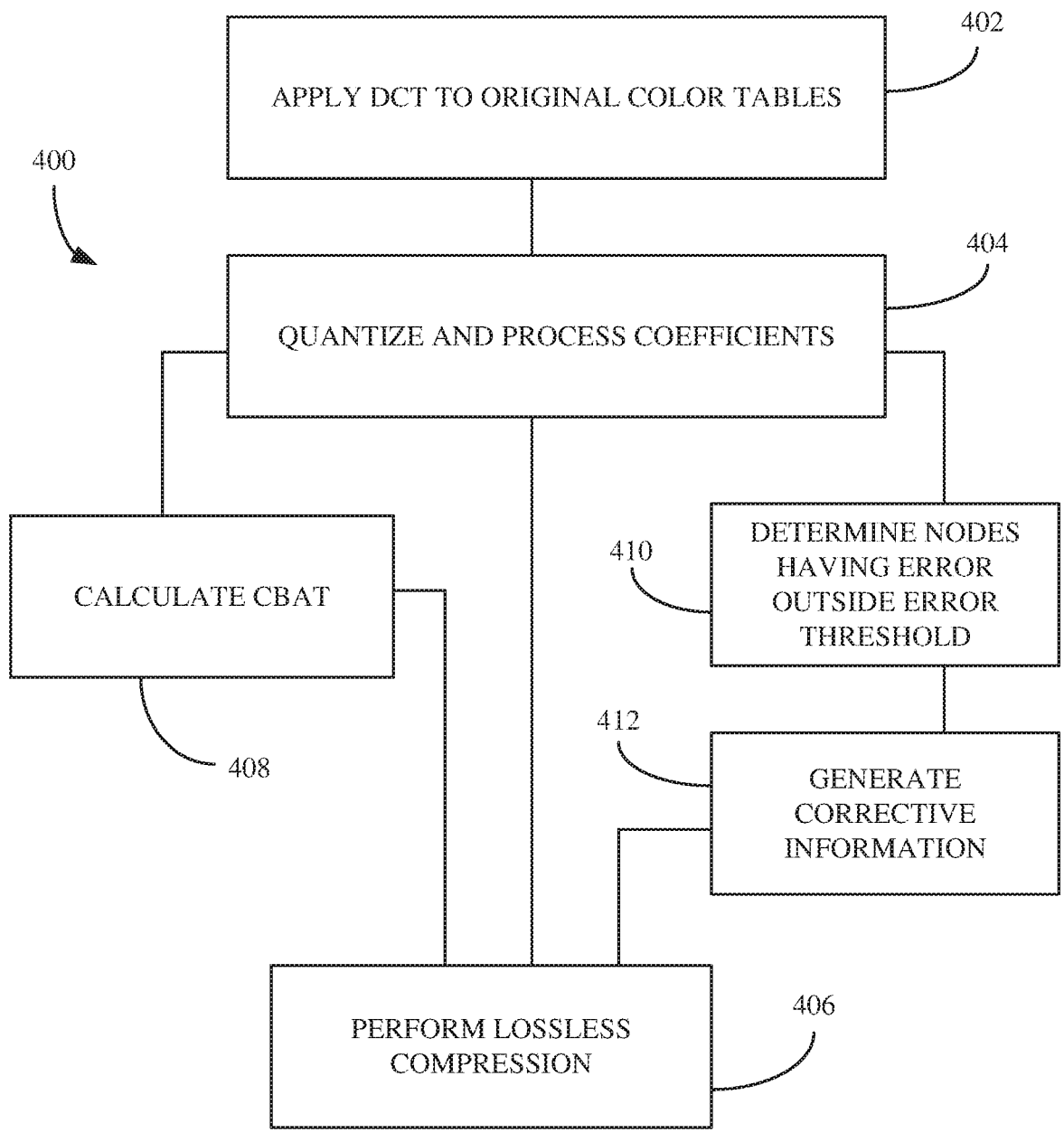
FIG. 4 is a block diagram illustrating an example method having additional features of the example method of FIG. 2.

FIG. 4 illustrates an example method 400 that can be employed as detailed implementations of one or both of method 200 to create memory devices 100 and 300. The example method 400 can be implemented in stages including a lossy stage that exploits specific characteristics of the color table data and a lossless stage for high data compression. In one example, the stages of the method are performed successively.

An example of method 400 includes applying a DCT process, such as a multidimensional DCT process, to the original color tables at 402. Particularly, a $J_{in}$-dimensional DCT process can be applied to the original color tables at 402. In general, a profile can include N color tables to be processed, such as $CLUT_1$, $CLUT_2$, . . . , $CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. Applying the $J_{in}$-dimensional DCT transform to the color tables $CLUT_i$, at 402 provides for DCT coefficients, which in the example includes as many coefficients as there are nodes in the original color table.

The DCT process at 402 yields AC coefficients and DC coefficients that are quantized and processed at 404. Informally, a coefficient that scales the constant basis function is referred to as the DC coefficient, while the other coefficients are referred to as AC coefficients. The AC coefficients are quantized using a fixed step size Δ, and rounded to the nearest integer in an example at 404. Additionally, the DC coefficients are also rounded to the nearest integer at 404, so they are effectively quantized to step size Δ=1. Quantization yields $J_{in}$-dimensional quantized coefficients.

In further processing at 404, the $J_{in}$-dimensional quantized coefficients are reordered into a one-dimensional data stream of a selected order. The selected order can be based upon a multidimensional zigzag ordering, such as a three-dimensional zigzag ordering, which can be used to reorder the quantized coefficients because the energy after the DCT transform is concentrated in the low frequency domain. In performing a three-dimensional ordering, traversals can be configured such that the planes i+j+k=c are visited in increasing order of c and a two-dimensional zigzagging is performed within each plane. Such traversals of the quantized coefficients from low-to-high frequency can introduce a large amount of redundancy to the coefficient bit assignment table, which can provide efficient packing of the data in compression. The resulting one-dimensional data stream of quantized coefficients can be written to a binary file.

The one-dimensional data stream of quantized coefficients in the binary file can be compressed with a lossless compression, such as LZMA described above or another lossless compression at 406 to create the compressed quantized coefficients from the lossy compression 304 of memory device 300.

The quantized coefficients are applied to calculate the coefficient bit assignment table (CBAT) at 408, which can be used for decoding the compressed color table. The coefficient bit assignment table stores the information related to how many bits are assigned to each coefficient. For example, $\lceil \log_2 L \rceil$ bits are used to quantize a real number in the range −0.5 to L−0.5 to an integer value, in which $\lceil \log_2 (L) \rceil$ represents a ceiling function of $\log_2 (L)$ and a ceiling function maps the real number to the smallest subsequent integer. An additional bit is provided to the sign because the coefficient can be a negative number. Each output channel can correspond to a separate coefficient bit assignment table. Accordingly, a profile having $J_{out}$ output channels will include $J_{out}$ coefficient bit assignment tables. The nodes in each coefficient bit assignment table correspond with the nodes of the original color table.

An example process can be applied to calculate a coefficient bit assignment table for each of the $J_{out}$ output channels at 408. For a given output channel, the quantized DCT coefficient of the output channel is denoted as $Q_{i,j}$, in which i (from 1 to N) is the color table number and j (from 1 to $M^{J_{in}}$) is the node number. The number of bits $B_{i,j}$ needed for $Q_{i,j}$ is $B_{i,j}=0$ if $Q_{i,j}$ is 0 and $B_{i,j}=\lceil \log_2 |Q_{i,j}| \rceil+1$ if $Q_{i,j}$ is not 0.

In one example, a fixed number of bits a can be assigned to every node of the coefficient bit assignment table and used to determine the size of each coefficient bit assignment table. The value of the coefficient bit assignment table at node location j, or $L_j$, can be determined from the largest number of bits $B_{i,j}$ needed for each i (from 1 to N) color table. The fixed number of bits a can be determined from the largest number of $\lceil \log_2 (L_j) \rceil$ as determined for each j (from 1 to $M^{J_{in}}$). In the example, the total size of one coefficient bit assignment table for an output channel is thus $aM^{J_{in}}$ bits. The above process can be repeated to determine the size for each output channel, and the total size is the sum of the sizes for the $J_{out}$ coefficient bit assignment tables.

The $J_{out}$ coefficient bit assignment tables are compressed such as with a lossless compression at 406 to create the compressed coefficient bit assignment table 306 of memory device 300. The total size of the coefficient bit assignment table can be significantly reduced via the lossless compression.

The selected step size Δ in 404 affects the compression, and a larger step size Δ achieves a larger amount of compression. The selected step size Δ in 404, however, also affects the amount of error between the original node in the color table and the reconstructed compressed value of the original node for each node, and a larger step size Δ creates a larger amount of error. For some reconstructed compressed values, the amount of error may be acceptable, such as generally imperceptible, for an application. In such cases, the color difference or amount of error is within a selected error threshold. In other cases, such as for colors around the neutral axis, an amount of error may be too perceptible for the application. In such cases, the amount of error is outside the scope of the selected error threshold. In one example, an amount of error outside the scope of the selected error threshold is an amount of error greater than the selected error threshold.

In order to achieve a high enough step size to provide benefits of lossy compression, one or more nodes may include an amount of error outside the scope of the selected error threshold. Nodes including an amount of error outside the scope of the selected error threshold are determined at 410. For such nodes, corrective information to modify the nodes is generated at 412 to create corrective information 308 on memory device 300.

Figure 5:
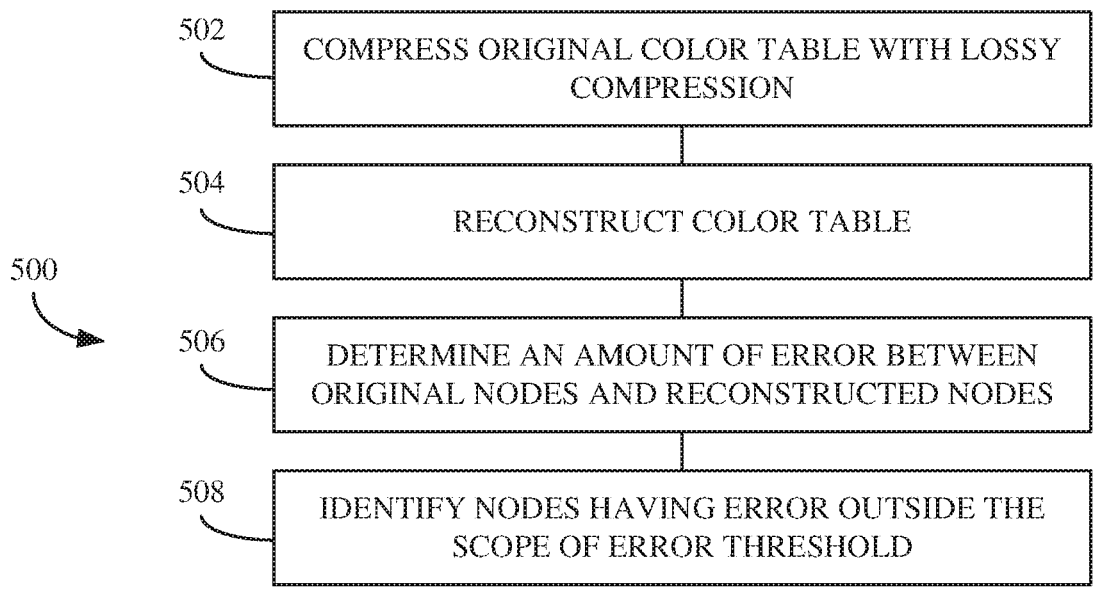
FIG. 5 is a block diagram illustrating an example method of the example method of FIG. 4.

FIG. 5 illustrates a method 500 that can be implemented in determining the nodes of the original color table to be modified with corrective information. In one example, the method 500 is performed using a selected step size and a selected error threshold. The original color table is compressed using a lossy compression technique such as DCT in 402, 404, 408 of method 400 at 502. The compressed color table is reconstructed via decoding to invert the compression and yield a reconstructed color table at 504. The nodes of the reconstructed color table are compared to the original color table to determine an amount of error at 506. The amount of error for a node, in one example, is the difference between the value associated with the node in the original color table and the value associated with the node of the reconstructed color table. In one example of 506, each node of the reconstructed color table is compared to its corresponding node in the original color table to determine an amount of error for that node.

In one example, the processes of 402, 404, and 408 can be reapplied to the original color table at a modified step size to include more nodes within the selected error threshold. For instance, if the amount of nodes of the reconstructed color table at having an amount of error outside of the selected threshold is too large for a given application, the processes 402, 404, 408 can be repeated on the original color table using a smaller step size $\Delta$.

The node or nodes that include an amount of error outside the scope of the selected error threshold are identified at 508 and corrective information is included for the identified nodes at 508. In one example of 412, the nodes of the original color table identified at 508 are stored as the corrective information on the memory device 300 with lossless compression to reduce the size of data on the memory device 300. In another example, of 412, the corrective information for the nodes of the original color table identified at 508 include residual values that can be added to (or subtracted from) the reconstructed nodes to bring the reconstructed node to within the selected error threshold for the node. The corrective information includes the residual values, which can then be losslessly compressed on memory device 300. In some example, corrective information 308 on memory device can include nodes of the original color to replace a set of reconstructed nodes of the color table as well as residual values that can be applied to the reconstructed nodes of the color table. In some examples, the residual values applied to the reconstructed nodes can bring the final values of the reconstructed nodes to within a second, more stringent error threshold than the error threshold associated with the first set of nodes. In another example, the residual values applied to the reconstructed nodes can bring the final value of the reconstructed nodes to be generally the same as the original nodes. The application of method 500 provides the option to store nodes with significant visual importance that may include perceptible error after lossy compression, such as nodes around the neutral axis, without loss. This improves the performance of the decoded compressed color table.

The compression ratio of the data on the memory device 300 (as compared to the original color table) and selected step size $\Delta$ are related when nodes exceeding a selected error threshold of color difference are stored without lossy compression at 410. In particular, as the selected step size $\Delta$ increases, the compression ratio first increases, reaches a peak value of compression ratio, and then decreases. Not being bound to a particular theory, as the selected step size $\Delta$ increases, the compression becomes more aggressive and the amount of error gets larger. As the number of nodes outside the scope of the selected error threshold increases, more nodes are stored without lossy compression or at a lower compression ratio reducing the efficiency of the color table compression. The peak value of the compression ratio for a selected error threshold provides an optimal compression ratio for a selected error threshold of color difference. Additionally, the peak value of compression ratio increases as the error threshold increases.

In one example, a process of first determining an acceptable error threshold in which nodes exceeding the threshold are stored without lossy compression, and then determining the selected step size $\Delta$ that corresponds to the peak compression ratio of the relation can be used to select the optimal compression ratio of the lossy compression.

Figure 6:
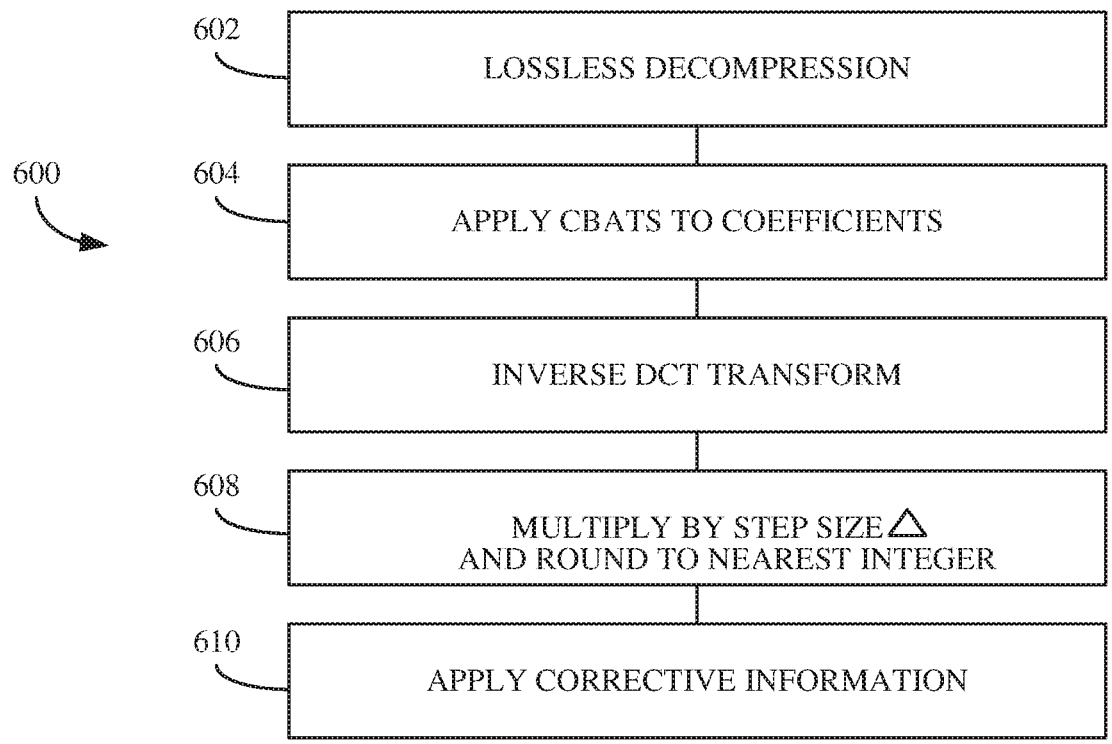
FIG. 6 is a block diagram illustrating an example method of decoding a compressed color table.

FIG. 6 illustrates a method 600 of decoding the compressed data table of method 400, such as an example of the compressed color table 302 on memory device 300. A standard lossless decompression technique, such as inverse LZMA or inverse GZIP (i.e., the inverse of the lossless compression applied at 406), is applied to the compressed color table at 602 to provide a binary stream including the coefficient bit assignment tables, quantized DCT coefficients, and additionally stored nodes (locations and values). The coefficient bit assignment tables can be used to determine how many bits of the binary stream belong to each node location. The coefficient bit assignment tables (CBATs) are applied to the quantized DCT coefficients to reconstruct the DCT coefficients at 604. An inverse DCT transform is applied to the DCT coefficients at 606. The coefficients are multiplied by the quantizer step size $\Delta$ and rounded to the nearest integer to obtain the initial reconstructed color tables at 608. The corrective information is applied to the initial reconstructed color tables at 610 to obtain the final reconstructed color tables. In one example the corrective information includes nodes of the original color table that replace nodes of the initial reconstructed color table. In another example, the corrective information includes residual values that can be applied to nodes of the initial reconstructed color table to obtain the final reconstructed color table. The final reconstructed $J_{in}$-dimensional to $J_{out}$-dimensional color tables can be applied to a color management system.

The methods of compressing a color table, such as method 400, were applied to the publicly available CGATS21_CRPC7.icc ICC profile and analyzed. In this profile, the B2A tables are L*a*b* to CMYK, so $J_{in}=3$, $J_{out}=4$, and M=33. Accordingly, there are $M^{J_{in}}=33^3$ nodes per output channel. The bytedepth (the number of bytes used to store the value as indicated in the ICC bytedepth field) is b=2. In total, there are $bJ_{out}M^{J_{in}}=2*4*333=287,496$ bytes in one B2A table. There are N=3 rendering intents, so there are 287,496*3=862,488 bytes for all the B2A tables that will be compressed.

The A2B tables are from CMYK to L*a*b*, so $J_{in}=4$, $J_{out}=3$, and there are $17^4$ nodes for each output channel. Table 1 shows the parameter values for each type of color tables.

TABLE 1

| Type | B2A | A2B |
|---|---|---|
| Byte Depth | 2 | 2 |
| $J_{in}$ | 3 | 4 |
| $J_{out}$ | 4 | 3 |
| M | 33 | 17 |
| N | 3 | 3 |
| Total Size (Bytes) | 862,488 | 1,503,378 |

The B2A color tables were compressed using the lossy compression methods and applied to the A2B tables to evaluate the compression performance. Table 2 shows the peak lossy compression ratio value, the average amount of error, and the standard deviation of the amount of error for selected error threshold amounts ($\Delta E$) 1, 2, and 3. Here, the errors are computed in CIE 1976 $\Delta E$ units, although other error measures could be used, as well.

TABLE 2

| $\Delta E_{max}$ | Compression Ratio | Average $\Delta E$ | Std. Dev. $\Delta E$ |
|---|---|---|---|
| 1 | 15.52:1 | 0.39 | 0.25 |
| 2 | 41.65:1 | 0.60 | 0.40 |
| 3 | 68.71:1 | 0.78 | 0.54 |

For the CGATS21_CRPC7.icc ICC profile, an error threshold of 1 corresponds to a peak lossy compression ratio of 15.52:1, and an error threshold of 2 corresponds to a peak lossy compression ratio of 41.65:1, and an error threshold of 3 corresponds to a peak lossy compression ratio of 68.76:1. The average error and the standard deviation of the error are also relatively small indicating good performance.

FIG. 7 illustrates an example system 700 that can be used to create and use a compressed color table 702 on a memory device 704. In one example, memory device 704 can correspond with the example memory devices 100, 300. Example system 700 includes a computing device 706 having a processor 708 and memory 710 that are configured to implement an example method of this disclosure, such as methods 200, 400, 500, as a set of computer readable instructions stored in memory 710 for controlling the processor 708 to perform the method. In one example, the set of computer readable instructions can be implemented as a computer program 712 that can include various combinations of hardware and programming configured to operate on computing device 706. Computer program 712 can be stored in memory 710 and executable by the processor 708 to create the compressed color table 702 on memory device 704.

The memory device 704 can be included in a consumable product 714 such as a printer cartridge having a reservoir of liquid ink, dry toner powder, or other printing or marking substance for use with a printer. In one example, the printer cartridge includes a color table corresponding with the printing or marking substance, such as a color table corresponding to black, cyan, magenta, or yellow ink.

The memory device 704 can be operably coupled to another computing device 716 having a processor 718 and memory 720 to read and apply the compressed color table 702. In one example, computing device 716 includes inherent printing capability and may be configured as a laser printer or ink-jet printer that can accept the memory device 704 and decompress and read the compressed color table 702 as a color look up table. The computing device 716 can include a set of computer readable instructions stored in memory 720 and executable by processor 718 to perform a method, such as the method 600 to decompress the color table 702 or otherwise apply the color table 702.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A print cartridge component comprising:
   a memory device comprising:
      coefficients based on a lossy compression of a first set of nodes each having a color difference within an error threshold between a node of a color table and a node of a reconstructed color table reconstructed by decompressing a lossy compressed version of the color table; and
      corrective information for a second set of nodes each including a color difference outside the error threshold between a node of the color table and a node of the reconstructed color table, wherein the coefficients and the corrective information are accessible by a printing device to reconstruct a color table to use in a color transformation between color spaces when printing.

2. The print cartridge component of claim 1, wherein the coefficients comprise quantized coefficients that include a step size that controls an amount of the lossy compression.

3. The print cartridge component of claim 1, wherein the coefficients and the corrective information are compressed with a lossless compression.

4. The print cartridge component of claim 1, wherein the first set of nodes and the second set of nodes are part of a compressed color table stored in the memory device.

5. The print cartridge component of claim 1, wherein the corrective information includes the second set of nodes.

6. The print cartridge component of claim 1, wherein the corrective information includes residual values to be applied to the color table reconstructed by the printing device from the coefficients.

7. The print cartridge component of claim 6, wherein the residual values are to be added to or subtracted from nodes of the color table reconstructed by the printing device from the coefficients.

8. The print cartridge component of claim 1, wherein the memory device further comprises a coefficient bit assignment table (CBAT) storing information related to how many bits are assigned to each coefficient of the coefficients.

9. The print cartridge component of claim 1, further comprising a reservoir containing a printing or marking substance, wherein the color table from which the coefficients are derived corresponds to the printing or marking substance.

10. A printer cartridge comprising:
    a memory device comprising:
       a plurality of quantized coefficients from a lossy compression of a first set of nodes each including a color difference within an error threshold between a node of a color table and a node of a reconstructed color table reconstructed by decompressing a lossy compressed version of the color table;

a coefficient bit assignment table (CBAT) for decoding the quantized coefficients the CBAT storing information related to how many bits are assigned to each quantized coefficient of the plurality of quantized coefficients; and corrective information for a second set of nodes each including a color difference outside the error threshold between a node of the color table and a node of the reconstructed color table, wherein the quantized coefficients and the corrective information are accessible by a printing device to reconstruct a color table to use in a color transformation between color spaces when printing.

11. The printer cartridge of claim 10, comprising a reservoir of ink having a color corresponding with the color table from which the plurality of quantized coefficients are derived.

12. The printer cartridge of claim 10, wherein the quantized coefficients include a step size that controls an amount of the lossy compression.

13. The printer cartridge of claim 10, wherein the corrective information includes residual values to be applied to a color table reconstructed by the printing device from the quantized coefficients.

14. The printer cartridge of claim 13, wherein the residual values are to be added to or subtracted from nodes of the color table reconstructed by the printing device from the quantized coefficients.

15. A method of compressing a color table, comprising:
receiving, by a system comprising a hardware processor, an error threshold of a color difference between a node in the color table and a node of a reconstructed color table reconstructed by decompressing a lossy compressed version of the color table;
compressing, by the system, a first set of nodes into a bitstream with a lossy compression, each node of the first set of nodes having a color difference within the error threshold between a node of the color table and a node of the reconstructed color table;
generating, by the system, corrective information for a second set of nodes each having a color difference outside the error threshold between a node of the color table and a node of the reconstructed color table;
storing, by the system, quantized coefficients output by the compressing of the first set of nodes in a memory device of a print cartridge component and
storing, by the system, the corrective information in the memory device.

16. The method of claim 15, wherein the compressing the first set of nodes with the lossy compression includes transforming the first set of nodes to obtain the quantized coefficients and further comprising calculating a coefficient bit assignment table (CBAT) from the quantized coefficients, the CBAT storing information related to how many bits are assigned to each quantized coefficient of the quantized coefficients.

17. The method of claim 16, further comprising storing the CBAT in the memory device.

18. The method of claim 15, comprising compressing the bitstream with a lossless compression.

19. The method of claim 15, wherein generating the corrective information includes compressing the second set of nodes with a lossless compression.

20. The method of claim 15, wherein the quantized coefficients and the corrective information in the memory device are accessible by a printing device to reconstruct a color table to use in a color transformation between color spaces when printing.

21. A method of compressing a color table, comprising:
transforming, by a system comprising a hardware processor, a first set of nodes with a lossy compression to obtain quantized coefficients, wherein each node of the first set of nodes includes a color difference within an error threshold between a node of the color table and a node of a reconstructed color table reconstructed by decompressing a lossy compressed version of the color table;
calculating, by the system, a coefficient bit assignment table (CBAT) from the quantized coefficients, the CBAT storing information related to how many bits are assigned to each quantized coefficient of the quantized coefficients;
generating, by the system, corrective information for a second set of nodes each having a color difference outside the error threshold between a node of the color table and a node of the reconstructed color table;
storing, by the system, the quantized coefficients in a memory device of a print cartridge component; and
storing, by the system, the corrective information in the memory device.

22. The method of claim 21, wherein the transforming includes performing a discrete cosine transform to obtain the quantized coefficients.

23. The method of claim 22, wherein the quantized coefficients are converted to integer values.

24. The method of claim 21, wherein the quantized coefficients and the CBAT are compressed with a lossless compression.

25. The method of claim 21, wherein the corrective information includes the second set of nodes.

26. The method of claim 21, wherein the quantized coefficients and the corrective information in the memory device are accessible by a printing device to reconstruct a color table to use in a color transformation between color spaces when printing.

27. The method of claim 21, further comprising storing the CBAT in the memory device.

* * * * *